United States Patent

Iguchi et al.

[11] Patent Number: 5,864,824
[45] Date of Patent: Jan. 26, 1999

[54] ELECTRONIC CASH REGISTER SYSTEM

[75] Inventors: Kesayoshi Iguchi, Fujisawa; Yoshio Ishibashi, Yokohama, both of Japan

[73] Assignee: Matsushita Electric Industrial Co., Ltd., Osaka, Japan

[21] Appl. No.: 905,538

[22] Filed: Aug. 4, 1997

Related U.S. Application Data

[63] Continuation of Ser. No. 348,858, Nov. 28, 1994, abandoned.

[30] Foreign Application Priority Data

Dec. 27, 1993 [JP] Japan .................................. 5-333297

[51] Int. Cl.⁶ .............................. G06F 17/60; H04Q 1/30
[52] U.S. Cl. .................... 705/15; 340/825.5; 340/825.51
[58] Field of Search ..................................... 395/287, 293,
395/294, 295, 296, 201, 215, 216, 221,
224, 225; 705/1, 15, 16, 21, 211, 25; 340/825.5,
825.51; 370/431, 437, 438, 439, 440, 462

[56] References Cited

U.S. PATENT DOCUMENTS

| | | | |
|---|---|---|---|
| 4,787,083 | 11/1988 | Tanaka | 370/85 |
| 4,803,681 | 2/1989 | Takahashi | 370/85 |
| 5,235,509 | 8/1993 | Mueller et al. | 364/405 |
| 5,353,219 | 10/1994 | Mueller et al. | 364/405 |

FOREIGN PATENT DOCUMENTS

| | | |
|---|---|---|
| 329082 A | 2/1991 | Japan . |
| 3110668 A | 5/1991 | Japan . |
| 4349592 A | 12/1992 | Japan . |

OTHER PUBLICATIONS

Patent Abstracts of Japan; 03–29082; ABS GRP No: P1194; ABS VOL NO: v15 n162; Abs Pub Date: Apr. 23, 1991; Kawashima et al.; Appl. No. 01–164689; Filed Jun. 27, 1989; Int–Cl.

Patent Abstracts of Japan; 05–20549; Abs Grp No: P1552; Abs Vol No: v17 n299; Abs Pub Date: Jun. 8, 1993; Odaka; Appl. No. 03–193581; Filed Jul. 9, 1991; Int–Cl.

Patent Abstracts of Japan; 05–324675; Abs Grp No: P1709; Abs Vol No: v18 n153; Abs Pub Date: Mar. 14, 1994; Kakizaki; Appl. No. 04–99167; Filed: Apr. 20, 1992; Int–Cl.

*Primary Examiner*—Stephen R. Tkacs
*Attorney, Agent, or Firm*—Stevens, Davis, Miller & Mosher, L. L. P.

[57] ABSTRACT

A plurality of registers having dual functions of entering commodity orders and performing cash tendering are installed at a commodity order position sequentially along a route to a commodity presentation position. A display control unit makes a display sequence of the contents of orders sent from the registers coincide with a sequence in which commodities are presented at the commodity presentation position. A display unit for displaying the content of each order in accordance with the output signal of the display control unit is installed at the commodity presentation position.

5 Claims, 9 Drawing Sheets

FIG. 2
PRIOR ART

15 HOLD
  1 BIG MAC
  2 POTATO:L
  1 COLA

21 PAID
  11 HAMBURGER
  2 CHEESE BURGER
  3 COFFEE
  5 COLA

22 TOTL
  3 POTATO:M
  2 HAMBURGER
  1 SPRITE
  2 FLIED CHICKEN
  1 ORANGE J
  3 SHAKE

23
  1 HAMBURGER
  2 COLA

FIG. 8

| HAMB | POTATO |
|------|--------|
| CHB | COFFEE |
| NUGT | TEA |
| DESER | COKE |

51

| 7 | 8 | 9 |
|---|---|---|
| 4 | 5 | 6 |
| 1 | 2 | 3 |
| 0 | | 00 |

52

| SUB-TOTAL |
|-----------|
| TOTAL / DEPOSIT ~53 |
| TANDEM ~54 |
| SERVE ~55 |

FIG. 9

OPERATION OF SECOND REGISTER 14

SCREEN OF SECOND REGISTER 14

HAMB — 61

200    TOTAL / DEPOSIT — 62

```
# 37              GO
  I HAMBURGER

TOTAL     180
  DEPOSIT   200
  CHANGE     80
```
— 65

TANDEM — 63

```
# 37            WAIT
  I HAMBURGER

TOTAL     180
  DEPOSIT   200
  CHANGE     80
```
— 66

CHB — 61

```
# 39            WAIT
  I CHEESE BURGER
```
— 67

TANDEM KEY DEPRESSED ON FIRST REGISTER 12 →

300    TOTAL / DEPOSIT — 62

```
# 39              GO
  I CHEESE BURGER

TOTAL     260
  DEPOSIT   300
  CHANGE     40
```
— 68

SERVE — 64

```
# 39              GO
  I CHEESE BURGER

TOTAL     260
  DEPOSIT   300
  CHEESE     40
```
— 69

ELECTRONIC CASH REGISTER SYSTEM

This application is a continuation of application Ser. No. 08/348,858, filed Nov. 28, 1994 (abandoned).

BACKGROUND OF THE INVENTION

1. Field of the Invention

The present invention relates to an electronic cash register system for entering customer orders and performing cash tendering at a drive-through restaurant or the like.

2. Description of the Related Art

FIG. 1 is a block diagram showing the system configuration of a conventional electronic cash register system used at a drive-through restaurant. The electronic cash register system comprises a menu board 72 for displaying the menu of the restaurant, an intercom 73 connecting the menu board 72 and an order window, a first register (order taker) 74 installed at the order window for entering orders, a second register (cashier) 76 installed at a cashing window for performing cash tendering, a display control unit 78 for receiving the contents of the orders and controlling the menu display, a display unit 79 installed at a commodity presentation window and connected to the display control unit 78 for displaying the contents of the orders, a control key unit 80 connected to the display control unit 78 for controlling the contents of the display, and a third register (cashier/order-taker) 81 installed at the commodity presentation window for entering orders and performing cash tendering. The first to third registers 74, 76, 81 are connected to the display control unit 78 through a communication line 82. FIG. 1 also shows a first vehicle 71 carrying a customer who places an order for commodities before the menu board 72, a second vehicle 75 carrying a customer who pays the charge at the cashing window, and a third vehicle 77 carrying a customer who receives the ordered commodities at the commodity presentation window.

Now, the operation of the conventional system described above will be explained. The customer in the first vehicle 71 places an order from within the vehicle for commodities through the intercom 73 while watching the menu on the menu board 72. The content of the order is transmitted through the intercom 73 to the order window, and a clerk operating the first register 74 receives the order and enters the content of the order in the first register 74. The content of the customer order entered in the first register 74 is sent through the communication line 82 to the display control unit 78. The display control unit 78 displays the received content of the order on the display unit 79 while at the same time storing the same content of the order therein. The customer riding in the first vehicle 71 pays the charge to a clerk operating the second register 76 at the cashing window located several meters away, and further receives the ordered commodities at the commodity presentation window located another several meters away. The display unit 79 includes, as shown in FIG. 2, for example, an unfilled order 83 indicated under "#23" on the right side of the lower column, a filled but unpaid order 84 under "#22 TOTL" at the center of the lower column, a paid order 85 under "#21 PAID" on the left side of the lower column, and a paid but not yet served order 86 under "#15 HOLD" on the left side of the upper column. The control key unit 80 for controlling the screen of the display unit 79 includes, as shown in FIG. 3, for example, a SERVE key 91 for erasing the order, a HOLD key 92 for holding the order temporarily and a HOLD SERVE key 93 for erasing the temporarily-held order.

At the cashing window, the content of the unpaid order at the top of the queue displayed under "#22 TOTL" is called from the display control unit 78 by way of the second register 76. The charge of the commodities indicated by the content of this order is notified to the customer, who pays the charge. Upon completion of cash tendering for all the commodities, letters "TOTL" in "#22 TOTL" are changed to "PAID". The order from the customer is displayed on the display unit 79 in the restaurant. A clerk at the commodity presentation window thus prepares the commodities while watching the display unit 79. When the preparation of the commodities is complete, the clerk delivers the commodities to the customer, and then operating the SERVE key 91, erases the particular order from the queue (SERVE). In the case where the commodities are not yet prepared, on the other hand, the clerk requests the customer to wait in the parking area and, operating the HOLD key 92, has the order of the particular vehicle translated to and displayed in another area of the display unit 79 (HOLD). Upon preparation of the commodities, the clerk delivers the commodities to the waiting vehicle, operates the HOLD SERVE key 93 to erase the display of the content of the order from the display unit 79 (HOLD SERVE). The third register 81 which includes an order-taker mode and a cashier mode is for processing an additional order which may be placed by a customer in a vehicle arriving at the commodity presentation window. This register 81 performs dual operation of order entry and cash tendering.

In this way, the conventional electronic cash register system used at a drive-through restaurant comprises a register in order-taker mode at the order window, a register in cashier mode at the cashing window, and a register in cashier/order-taker mode at the commodity presentation window, thereby realizing a drive-through set-up in which customer orders can be smoothly processed in sequence.

In the configuration of the conventional electronic cash register system described above, however, it sometimes happens that the clerk receives a wrong customer order at the order window due to a hearing amiss with the result that the right commodities cannot be prepared making the customer feel uncomfortable. Also, there are customers who avoid a shop with an intercom as they hate or are not good at placing an order through the intercom. Another problem is that the guide to or recommendation of a commodity is difficult for lack of face-to-face service between the clerk and the customer.

A drive-through sale system for preventing presentation errors and related payment errors is disclosed in JP-A-4-349592. In this drive-through sale system, the license number of a customer vehicle is recognized by a license number reader from the image pick-up output of the customer vehicle. The recognized vehicle license number of the orderer vehicle together with corresponding ordered commodities are stored in a drive-through controller. The payment section and the order presentation section recognize the vehicle license number, and the drive-through controller is searched using the recognized license number. As a result, the price of the ordered commodities corresponding to the licence number is charged at the payment section, and the commodities corresponding to the license number are delivered to the customer at the ordered commodity presentation section.

A restaurant automation system for presenting the menu ordered by a customer correctly to a table where he sits is disclosed in JP-A-3-110668. In this automation system aimed at restaurants, the customer order entered from the electronic cash register system is displayed on a TV set placed in a cookery. At the same time, the number of the table where the customer sits is input through a table number input terminal. The customer order and the number of the table where the customer sits are thus made to correspond to each other. After completion of the cooking, a presentation card indicating the menu ordered by the customer and the corresponding table number is printed out.

Further, a drive-through ordering system is disclosed by JP-A-3-29082 which comprises two vehicle-moving customer order input units in juxtaposition and an indicator for indicating to the next vehicle the input unit by which the particular vehicle is served, wherein customer orders for two vehicles are received at the same time and the next-waiting vehicle is advanced to the input unit which has processed the order earlier, thereby shortening both the time for entering customer orders and the time for processing orders.

SUMMARY OF THE INVENTION

The object of the present invention is to provide an electronic cash register system configured similar to the conventional systems and capable of the face-to-face sale by the clerk.

The electronic cash register system according to the present invention comprises a plurality of register means installed sequentially at a commodity ordering place along a route to a commodity presentation place for entering commodity orders and performing cash tendering, display control means for making a display sequence of contents of orders sent from the plurality of register means coincide with a sequence in which commodities are presented at the commodity presentation place, and display means installed at the commodity presentation place for displaying the content of each order in accordance with an output signal of the display control means.

In the electronic cash register system according to the present invention, each register means is capable of entering commodity orders and performing cash tendering, with the display sequence of the order contents made coincident with the sequence of commodities to be presented. Thus the face-to-face sale to customers is made possible with fewer wrong order processings while at the same time guiding and recommending the menu to the customers, thereby improving the sense of satisfaction on the part of customers. Also, in applications of the electronic cash register system according to the present invention to the drive-through system, it is only necessary to install as many register as in the conventional cash register system. Therefore, a drive-through system superior to the prior art can be realized without increasing the equipment investment of the shop.

BRIEF DESCRIPTION OF THE DRAWINGS

FIG. 2 is a diagram showing an example of a display for explaining the operation of the conventional cash register system shown in FIG. 1.

FIG. 8 is a diagram showing a model keyboard of a register according to a third embodiment of the present invention.

FIG. 9 is a diagram showing an example of the screen of a second register for explaining the operation of a third embodiment of the present invention.

DESCRIPTION OF THE PREFERRED EMBODIMENTS

Figure 1:
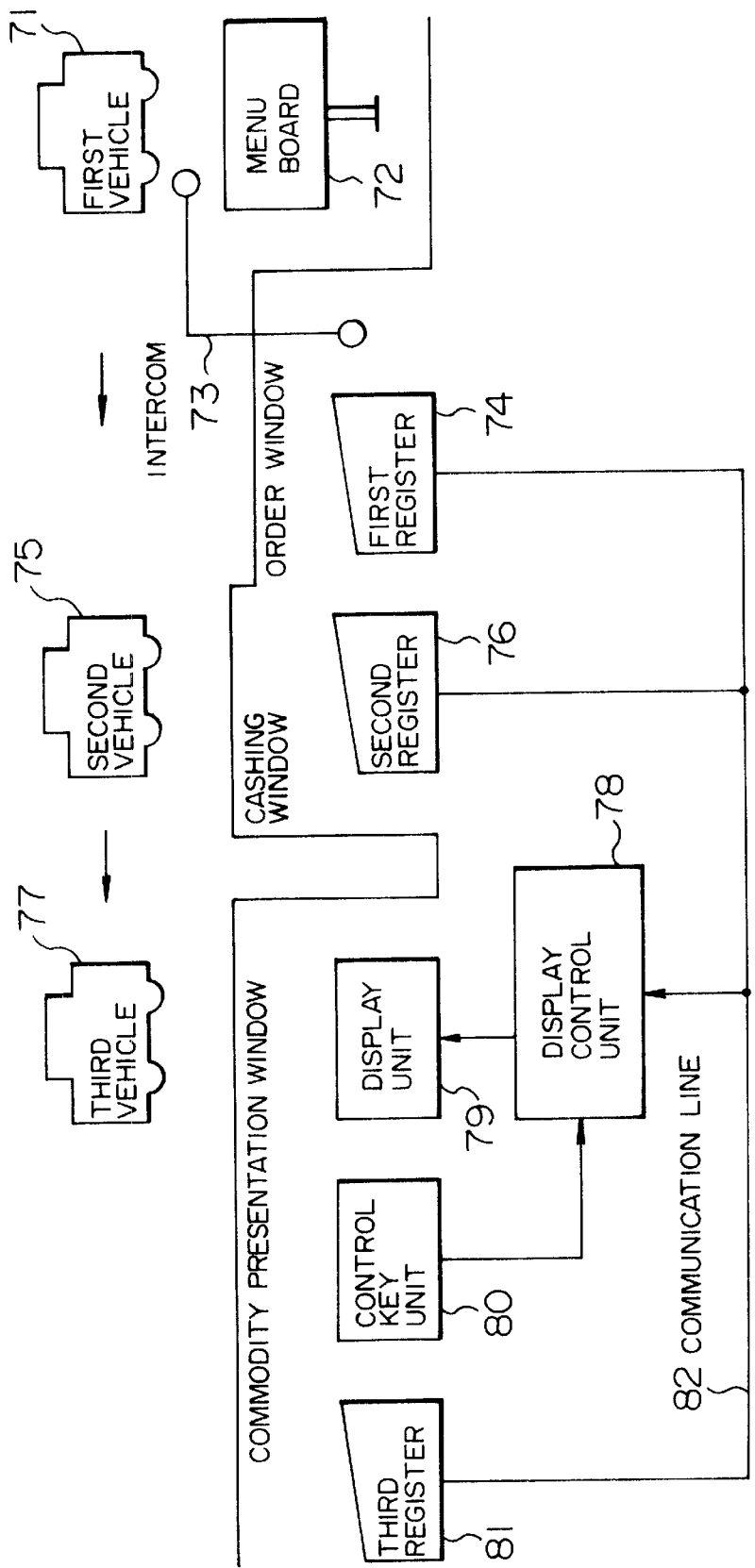
FIG. 1 is a block diagram showing the system configuration of a conventional electronic cash register system used at a drive-through restaurant.
Figure 3:
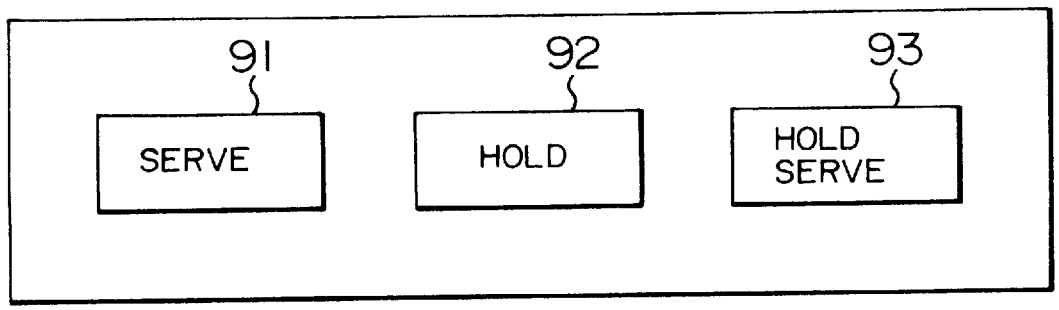
FIG. 3 is a diagram showing model control keys according to the prior art shown in FIG. 1.
Figure 4:
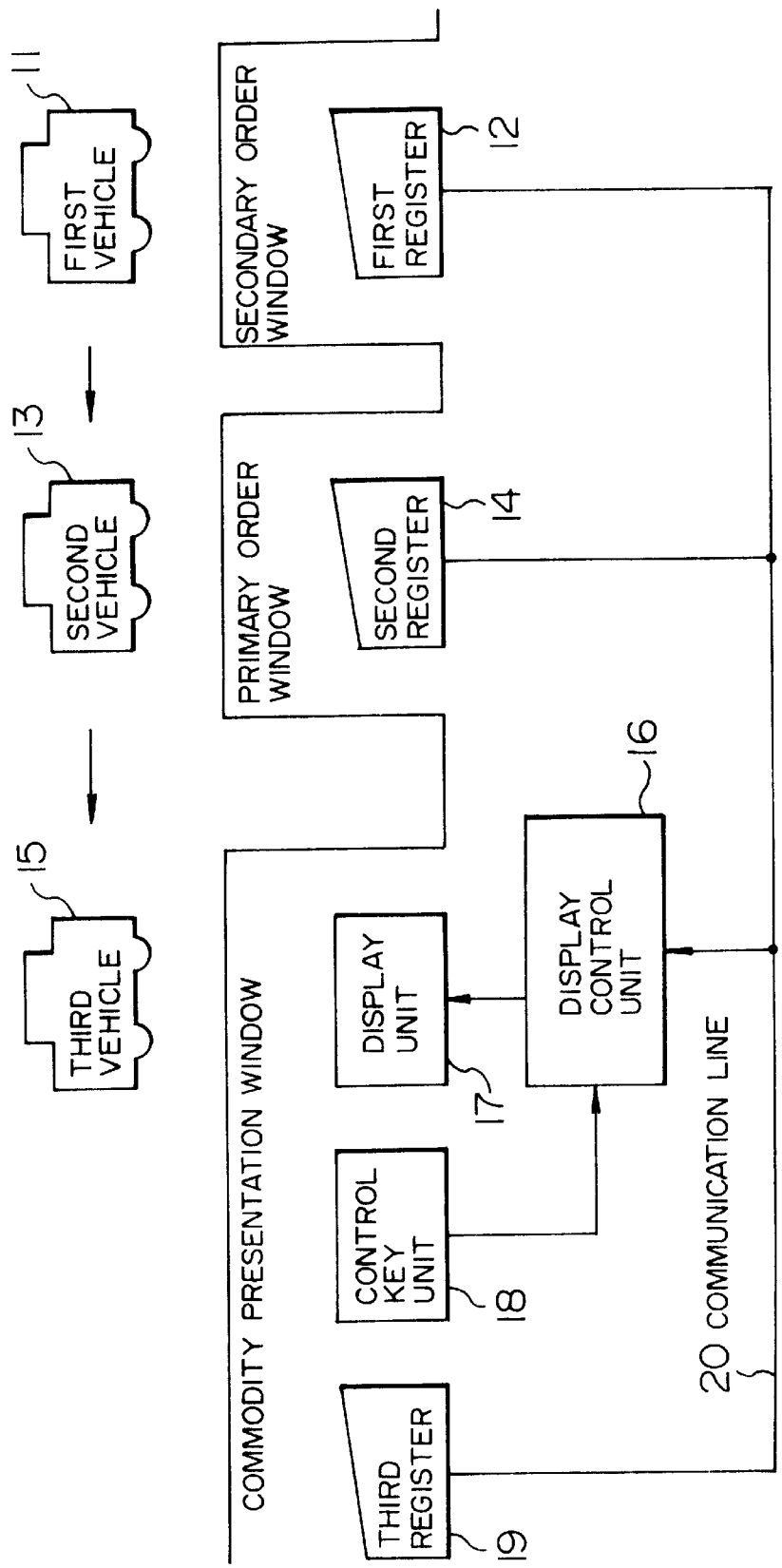
FIG. 4 is a block diagram showing the system configuration of an electronic cash register system used at a drive-through restaurant according to a first embodiment of the present invention.

An electronic cash register system used at a drive-through restaurant according to a first embodiment of the present invention, as shown in FIG. 4, comprises a first register 12, a second register 14, a display control unit 16, a display unit 17, a control key unit 18 and a third register 19. FIG. 4 also shows a first vehicle 11 in which a customer rides for ordering commodities and paying the charge at a secondary order window, a second vehicle 13 in which a customer rides for ordering commodities and paying the charge at a primary order window, and a third vehicle 15 in which a customer rides for receiving ordered commodities at a commodity presentation window.

The first register 12 has dual functions of entering commodity orders and performing cash tendering (secondary cashier/order-taker) and is installed at the secondary order window. The second register 14 is for performing both the entry of commodity orders and cash tendering (primary cashier/order-taker) and is installed at the primary order window. In the electronic cash register system according to this embodiment, the second register 14 installed at the primary order window is given priority over the first register 12 installed at the secondary order window. The reason is that in the case of congestion where a plurality of vehicles form a queue, the vehicles always move from the position of the first vehicle 11 to the position of the third vehicle 15 via the position of the second vehicle 13, and commodities are presented at the commodity presentation window to the leading vehicle first. The first register 12 and the second register 14 are both connected to the display control unit 16 through a communication line 20.

The display control unit 16 receives the contents of the orders transmitted from the first register 12 and the second register 14 through the communication line 20. In accordance with the order of priority of the first register 12 and the second register 14, the sequence of display of the content of the order received from the first register 12 and the content of the order received from the second register 14 is made to coincide with the sequence of commodity presentation and is displayed on the display unit 17. The display unit 17 is for displaying the content of each order in accordance with the output signal of the display control unit 16 and is installed at the commodity presentation window.

Figure 5:
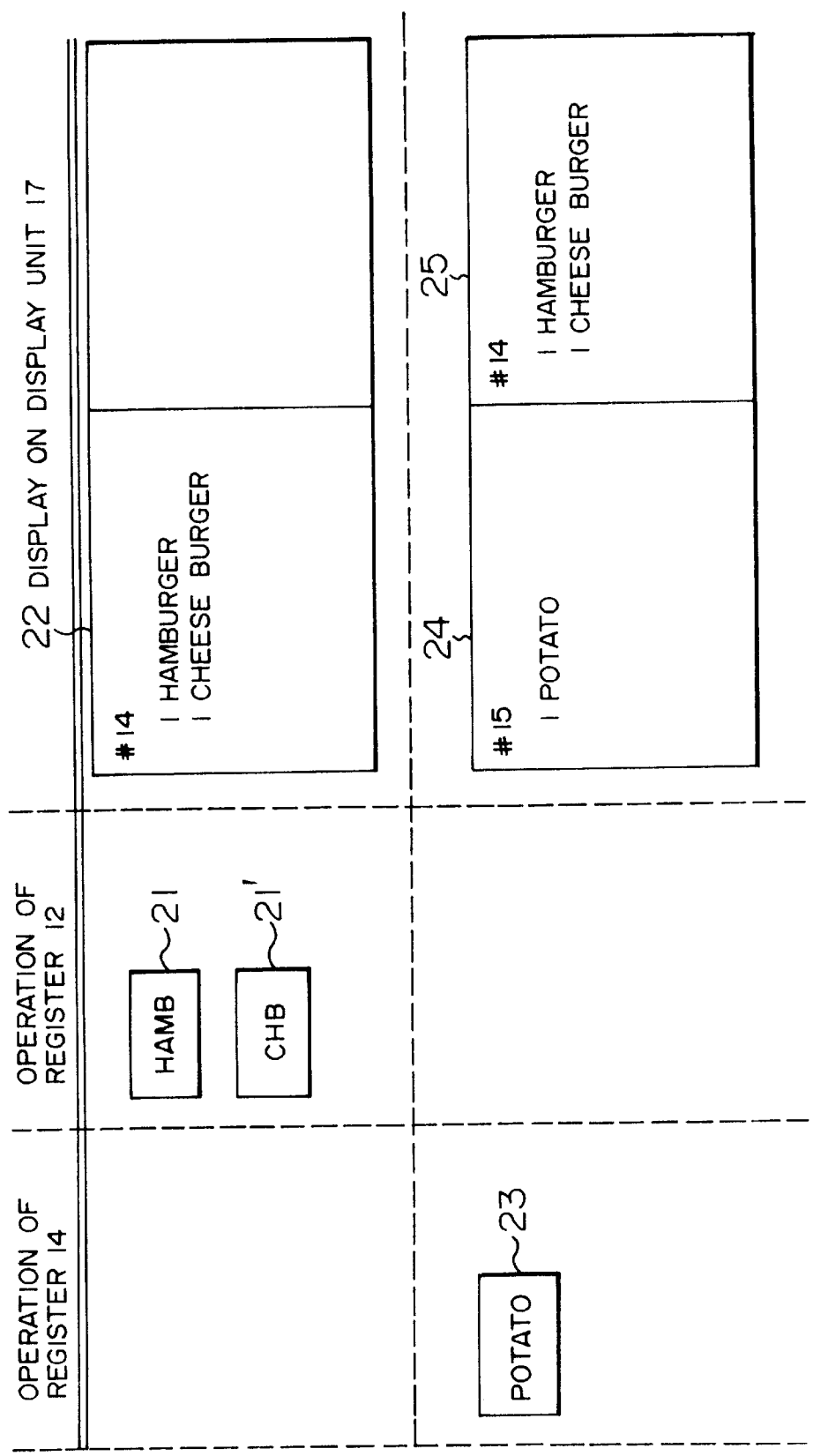
FIG. 5 is a diagram showing an example of a display for explaining the operation of the first embodiment of the present invention.
Figure 6:
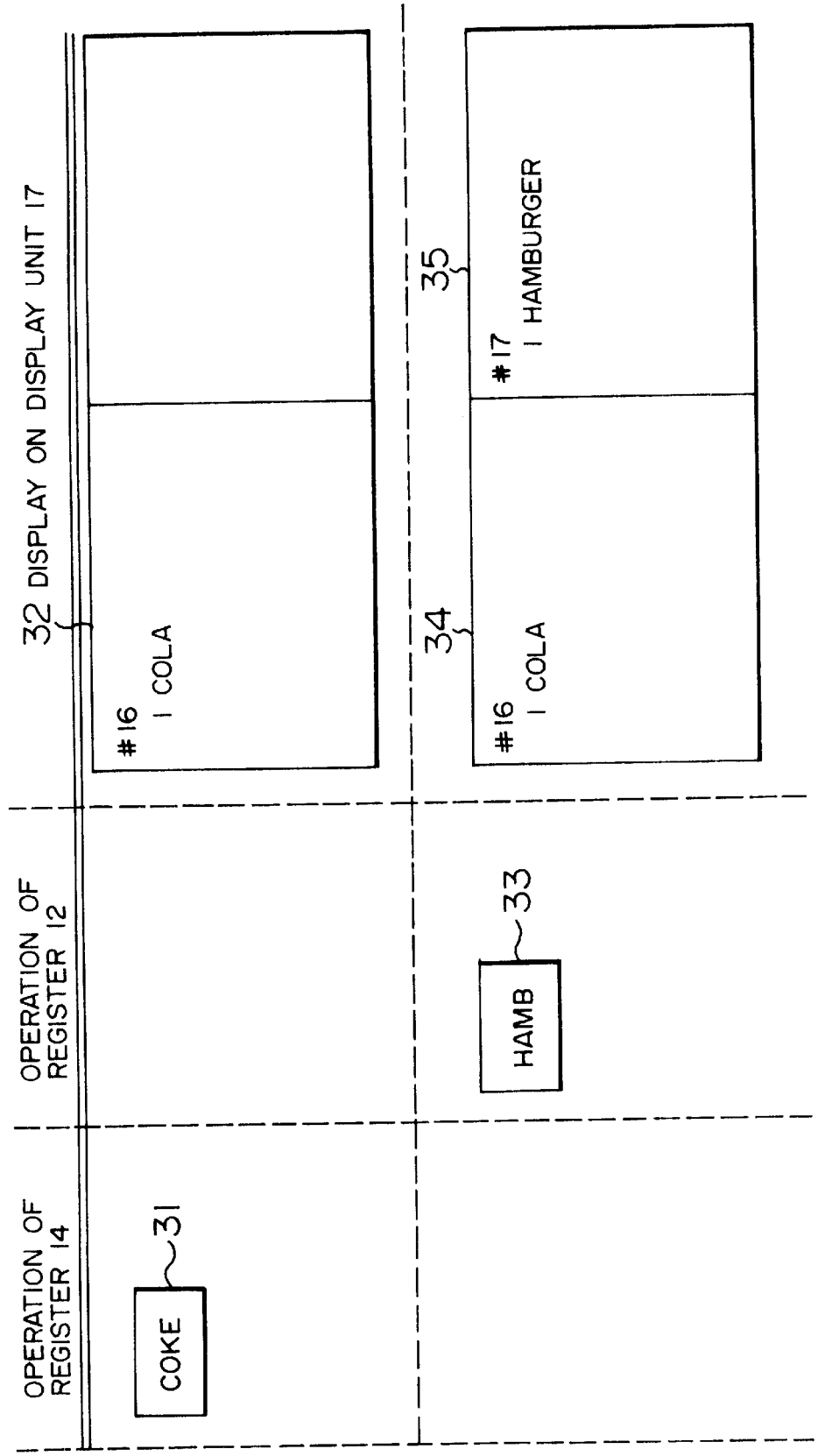
FIG. 6 is a diagram showing another example of the display for explaining the operation of the first embodiment of the present invention.

The relation between the key manipulation on the first and second registers 12, 14 and the display on the display unit 17 will be explained with reference to FIGS. 5 and 6. First, assume that the content of an order is input from the first register 12 installed at the secondary order window before the content of an order from the second register 14 installed at the primary order window in FIG. 5. When the customer riding in the first vehicle 11 orders a hamburger and a cheese burger at the secondary order window, a HAMB key 21 representing hamburger and a CHB key 21' representing cheese burger are depressed on the first register 12, and the content of the order from the first register 12 is transmitted through the communication line 20 to the display control unit 16. The display control unit 16 that has received the content of the order from the first register 12, as shown in the display area 22 of the display unit 17 in the upper right half of FIG. 5, causes the content of the order received from the first register 12 to be displayed at the left position on the screen of the display unit 17. When the customer riding in the second vehicle 13 orders potato at the primary order window, a POTATO key 23 representing potato is depressed on the second register 14, and the content of the order from the second register 14 is transmitted to the display control unit 16 through the communication line 20. Since the second register 14 is higher in priority than the first register 12, the display control unit 16 that has received the content of the order from the second register 14 causes the content of the order received from the second register 14 to be displayed at the left position on the screen of the display unit 17, while at the same time transferring the content of the order from the first register 12 thus far displayed at the same position to the right position on the screen (See the display areas 24, 25 of the display unit 17 shown at the lower right half of FIG. 5). As a result, the sequence of display of the content of the order received from the first register 12 and that received from the second register 14 is made to coincide with the sequence of commodity presentation, since the second vehicle 13 is higher than the first vehicle 11 in the priority of order of commodity presentation at the commodity presentation window.

Now, with reference to FIG. 6, explanation will be made about the case in which the content of an order from the second register 14 installed at the primary order window is input before that from the first register 12 installed at the secondary order window. When the customer riding in the second vehicle 13 orders a cup of cola at the primary order window, a Cola key 31 representing cola is depressed on the second register 14, and the content of the order from the second register 14 is transmitted through the communication line 20 to the display control unit 16. The display control unit 16 that has received the content of the order from the second register 14, as shown in the display area 32 of the display unit 17 in the upper right half of FIG. 6, causes the content of the order received from the second register 14 to be displayed at the position to the left on the screen of the display unit 17. When the customer riding in the first vehicle 11 orders a hamburger at the secondary order window, a HAMB key 33 representing hamburger is depressed on the first register 12, and the content of the order from the first register 12 is transmitted to the display control unit 16 through the communication line 20. Since the first register 12 is lower in the priority of order than the second register 14, the display control unit 16 that has received the content of the order from the first register 12 causes the same content of the order to be displayed at the position to the right on the screen of the display unit 17 in FIG. 6 without transferring the content of the order received from the second register 14 that has thus far been displayed to the left on the screen (See the display areas 34, 35 of the display unit 17 shown at the lower left half of the drawing). As a result, the sequence of display of the content of the order received from the first register 12 and that received from the second register 14 is made to coincide with the sequence of commodity presentation, since the order of priority of commodity presentation at the commodity presentation window is higher for the second vehicle 13 than for the first vehicle 11.

The control key unit 18 is connected to the display control unit 16 for manipulating the display of the display unit 17. The third register 19 is for performing both the entry of commodity orders and cash tendering (cashier/order-taker) and is installed at the commodity presentation window. The third register 19 is connected through the communication line 20 to the display control unit 16.

Now, explanation will be made about the operation of the electronic cash register system according to this embodiment. The customer riding in the first vehicle 11 at the drive-through restaurant, when the customer riding in another vehicle (the second vehicle 13) is placing an order at the primary order window, stops before the secondary order window and places an order for commodities with a clerk operating the first register 12 while watching the menu. The clerk accepts the order and enters the content of the order in the first register 12, and when the order is filled, processes the total. The content of the customer order input in the first register 12 is sent through the communication line 20 to the display control unit 16.

In the meantime, when the second vehicle 13 moves forward from the primary order window where it has stayed, the vehicle of the next customer stops at the primary order window beyond the first vehicle 11 staying at the secondary order window, and places an order for commodities with a clerk operating the second register 14 while watching the menu. The clerk accepting the order inputs the content of the order in the second register 14, and upon filling the order, performs cash tendering. The content of the customer order input in the second register 14 is sent through the communication line 20 to the display control unit 16.

The display control unit 16 displays the contents of the two received orders on the display unit 17 as described above and at the same time stores them therein. The customer riding in the second vehicle 13 receives the ordered commodities at the commodity presentation window located several meters away, and then leaves the commodity presentation window. The first vehicle 11 cannot move forward while the second vehicle 13 stays ahead. Therefore, the first vehicle 11 moves to the commodity presentation window and receives the ordered commodities after the second vehicle 13 moves forward and leaves the commodity presentation window.

A clerk prepares the commodities while watching the display unit 17 at the commodity presentation window and presents the commodities to the customer while controlling the display on the display unit 17 by the control key unit 18. When the commodities are not prepared as yet, the clerk requests the customer to wait at the parking area and presents the commodities as soon as the commodities are prepared. The third register 19 enters and processes the accounting for the additional order which may be placed by the customer in the third vehicle 15 driving up to the commodity presentation window.

In this way, according to the first embodiment, each of a plurality of registers is capable of both entering orders and performing cash tendering, and the order of priority of registers is set based on the route of vehicle movement. The display control unit arranges the contents of orders in such a way as to be displayed in the same sequence as the vehicles. Thus the face-to-face sale is made possible with the same number of registers as in the prior art, thereby improving the customer feeling of satisfaction.

Now, explanation will be made about an electronic cash register system used at a drive-through restaurant according to a second embodiment of the present invention. The electronic cash register system according to this embodiment, which has the same configuration as the electronic cash register system according to the first embodiment shown in FIG. 4, is different from the electronic cash register system according to the first embodiment in that the display control unit 16 controls the sequence of transmission of the contents of orders from the registers 12, 14, 19, and in accordance with the sequence of transmission, displays the contents of orders on the display unit 17.

Figure 7:
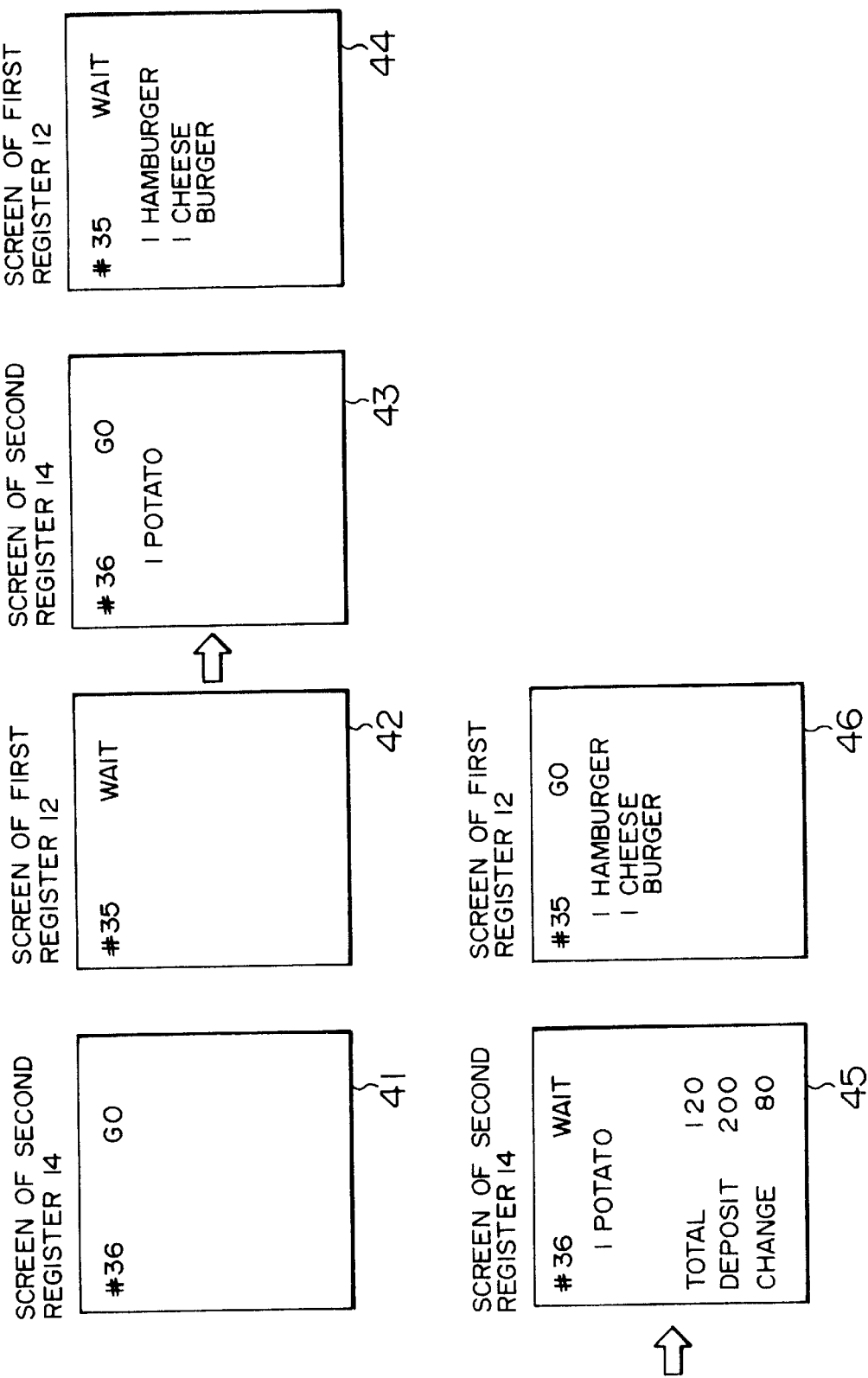
FIG. 7 is a diagram showing an example of the screen of each register for explaining the operation of a second embodiment of the present invention.

In the electronic cash register system according to this embodiment, letters "GO" indicating that the content of the order may be applied to the display control unit 16 are displayed on the screen immediately after power-on of the second register 14 installed at the primary order window as shown in the screen 41 at the upper left side in FIG. 7. Also, letters "WAIT" indicating that the content of the order cannot be sent to the display control unit 16 are displayed on the screen 42 immediately after power-on of the first register 12 installed at the secondary order window as shown in the second screen 42 from the upper left side in FIG. 7. After that, when an order for potato is accepted on the second register 14, letters "POTATO" are newly displayed on the screen of the second register 14 as shown in the second screen 43 from the upper right end in FIG. 7. In the process, letters "GO" continue to be displayed. When an order for hamburger and cheese burger is received on the first register 12, the letters of "HAMBURGER" and "CHEESE BURGER" are newly displayed while letters "WAIT" also continue to be displayed as shown in the screen 44 at the upper right part of FIG. 7.

Upon completion of cash tendering on the second register 14, the data indicating that cash tendering has been completed is sent from the second register 14 to the display control unit 16. The display control unit 16, upon recognition from this data that cash tendering in the second register 14 is complete, transmits the data for displaying letters "WAIT" to the second register 14. As a result, letters "GO" thus far displayed are erased and letters "WAIT" are displayed on the screen of the second register 14 as shown in the screen 45 at the lower left part of FIG. 7. Also, the display control unit 16 transmits the data for displaying letters "GO" to the first register 12. Consequently, letters "WAIT" thus far displayed are erased and letters "GO" are displayed on the screen of the first register 12 as shown in the screen 46 shown at the lower right part of FIG. 7. As a result, cash tendering in the first register 12 is made possible. After that, upon completion of cash tendering on the first register 12, the data indicating the completion of cash tendering is sent from the first register 12 to the display control unit 16. The display control unit 16, upon recognition from the same data that cash tendering is complete on the first register 12, transmits the data for displaying letters "WAIT" to the first register 12 while at the same time sending the data for displaying letters "GO" to the second register 14.

In this way, according to the second embodiment, each of the registers installed is capable of processing orders and accounts at the same time. The display control unit controls the transmission rights of the registers individually and arranges the contents of orders in the sequence of vehicles. In this way, the face-to-face sale is made possible with the same number of registers as in the prior art, thus improving the customer feeling of satisfaction.

Now, an electronic cash register system used at a drive-through restaurant according to a third embodiment of the present invention will be described. The electronic cash register system according to this embodiment, which like the electronic cash register system according to the second embodiment, has the same configuration as the electronic cash register system according to the first embodiment shown in FIG. 4, is different from the electronic cash register system according to the second embodiment in that the electronic cash register system has a TANDEM key and a SERVE key added to the keyboards of the first and second registers 12 and 14. More specifically, the keyboards of the first and second registers 12, 14 in the electronic cash register system according to this embodiment, as shown in FIG. 8, like the keyboards of the first and the second registers 12, 14 of the electronic cash register system according to the second embodiment described above, has menu keys 51 for entering the ordered commodities, numeric keys 52 for entering the prices or the like and a TOTAL/DEPOSIT key 53, with a TANDEM key 54 and a SERVE key 55 newly added.

During the peak hours, a succession of vehicles appear at the primary and secondary order windows. As in the electronic cash register system according to the second embodiment described above, therefore, the orders received at the primary order window are displayed on the display unit 17 alternately with the orders received at the secondary order window. During the idle time zone when the vehicle traffic dwindles, however, orders are not always alternated between the primary and the secondary order windows. In the electronic cash register system according to this embodiment further comprising the TANDEM key 54 and the SERVE key 55 on the keyboards of the first and second registers 12 and 14, orders can be received alternately at the primary order window and the secondary order window or successively either at the primary order window or the secondary order window.

Now, with reference to FIG. 9, explanation will be made about the operation of the electronic cash register system according to this embodiment in which the transmission right is alternated between the first register 12 and the second register 14 by the TANDEM key during the peak hours. Letters "GO" indicating that the content of an order can be sent to the display control unit 16 are assumed to be displayed on the second register 14 installed at the primary order window. The menu key 61 indicating HAMBURGER on the second register 14 is depressed, and numeral "200" indicating the price of 200 yen deposited from the customer is entered by way of the numeric keys 52. After that, when the TOTAL/DEPOSIT key 53 is depressed, letters "HAMBURGER" indicating the ordered commodity are displayed at the upper part of the screen 65 shown at the upper right side in FIG. 9. At the same time, the numeral "180" indicating the price of 180 yen of the commodity HAMBURGER is displayed in the TOTAL column, numeral "200" indicating the price of 200 yen deposited from the customer in the DEPOSIT column, and numeral "20" indicating the 20 yen as a change to be paid to the customer in the CHANGE column. The content of the order entered by the second register 14 is transmitted to the display control unit 16.

Then, in order to grant the transmission right to the first register 12 installed at the secondary order window, the TANDEM key 54 is depressed on the second register 14. Letters "GO" that have thus far been displayed on the screen of the second register 14 are switched to letters "WAIT" indicating that the content of the order cannot be sent to the display control unit 16 as shown in the screen at the second stage from the top in FIG. 9. When letters "WAIT" are displayed on the screen of the second register 14, assume that the next customer arriving at the primary order window orders a cheese burger. When the menu key 61 labeled CHEESE BURGER of the second register 14 is depressed, letters "CHEESE BURGER" that is the ordered commodity are displayed in the upper part of the screen 67 as shown at the upper right side of the third stage from the top in FIG. 9. Since letters "WAIT" are on display, the content of this particular order is not transmitted to the display control unit 16. Under this condition, depression of the TANDEM key 54 of the first register 12 installed at the secondary order window grants the transmission right to the second register 14. Then, as shown in the screen 68 at the lower right side in the third stage from the top in FIG. 9, letters "WAIT" are switched to "GO" on the screen of the second register 14, and at the same time the content of this particular order is transmitted to the display control unit 16. Then, numeral "300" indicating the amount of 300 yen deposited by the customer is entered by way of the numeric keys 52. Upon depression of the TOTAL/DEPOSIT key 53, numeral "260" representing the price 260 yen of the commodity CHEESE BURGER is displayed in the TOTAL column, numeral "300" representing the amount of 300 yen deposited by the customer in the DEPOSIT column, and numeral "40" representing the change of 40 yen to be repaid to the customer in the CHANGE column.

Now, the operation of the electronic cash register system according to this embodiment will be explained with reference to the case where vehicle traffic dwindles or during idle hours. In this case, a customer in a vehicle arriving at the drive-through restaurant orders commodities at the primary order window. The clerk operating the second register 14 installed at the primary order window, after depressing the TOTAL/DEPOSIT key 53 of the second register 14, always depresses the SERVE key 55 of the second register 14. As a result, the transmission right of the second register 14 is reserved at second register 14, and therefore the orders can be successively processed on the second register 14. Assume for example that after the TOTAL/DEPOSIT key 62 is depressed in the case shown at the third stage from the top in FIG. 9, the SERVE key 64 is depressed instead of the TANDEM key 63 as shown in the bottom stage of FIG. 9. Letters "GO" continue to be displayed on the screen 69 of the second register 14 as shown at the right side in the bottom stage of FIG. 9.

As described above, according to the third embodiment in which the TANDEM key and the SERVE key are added to each register of the second embodiment to permit each register to change the transmission right, accurate control is possible according to the degree of vehicle traffic density. Also, the clerks attending other registers can take a rest while the vehicle traffic decreases or during idle hours.

We claim:

1. An electronic cash register system comprising:

a plurality of register means installed at a commodity ordering place sequentially along a route to a commodity presentation place, each for performing both entering commodity orders and performing cash tendering;

display control means for making a display sequence of contents of orders sent from said plurality of register means coincide with a sequence in which commodities are presented at said commodity presentation place; and display means installed at said commodity presentation place for displaying the content of each order in accordance with an output signal of said display control means;

wherein said display control means controls transmission rights of said plurality of register means individually and makes said display means display the contents of orders sent from said plurality of register means according to the sequence in which said plurality of register means are granted the transmission right.

2. An electronic cash register system according to claim 1, wherein each of said register means includes means for granting the transmission right to other register means and means for preventing the transmission right from being granted to other register means.

3. An electronic cash register system according to claim 2, wherein said means for granting the transmission right to other register means is a tandem key included in each of said register means, and said means for preventing the transmission right from being granted to other register means is a serve key included in each of said register means.

4. An electronic cash register system according to claim 2, wherein said preventing means prevents the transmission right from being granted to other register means after the register means presently having the transmission right has completed transmission of all of its current contents of orders to the display control means.

5. An electronic cash register system according to claim 1, wherein said display control means controls said transmission rights by transmitting a WAIT signal denying a transmission right to one of said plurality of register means and a GO signal granting a transmission right to one of said plurality of register means.

* * * * *